J. J. MUIR.
TRUCK.
APPLICATION FILED SEPT. 7, 1916.
1,250,621.
Patented Dec. 18, 1917.
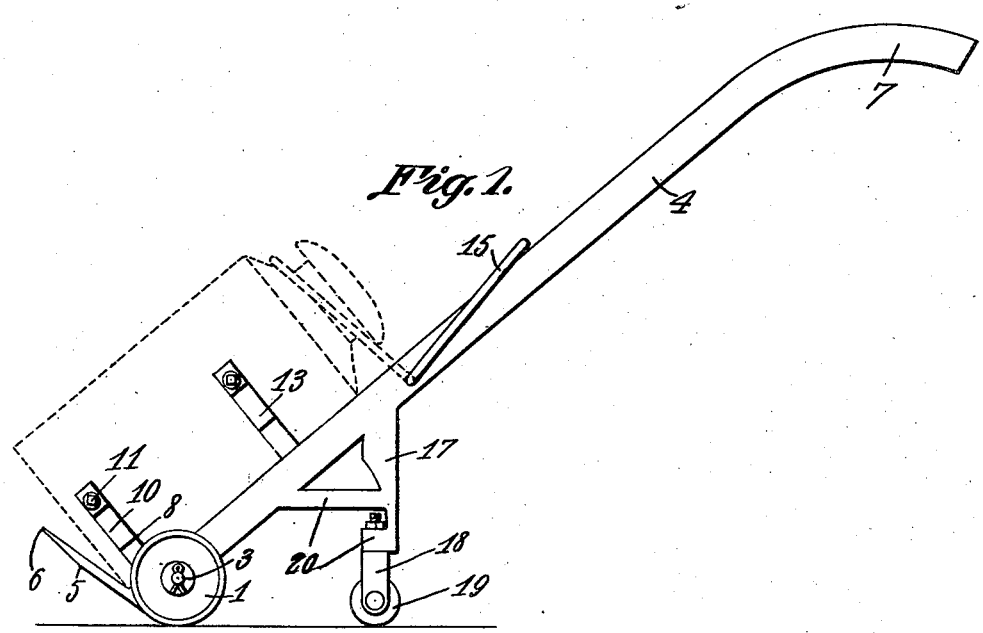
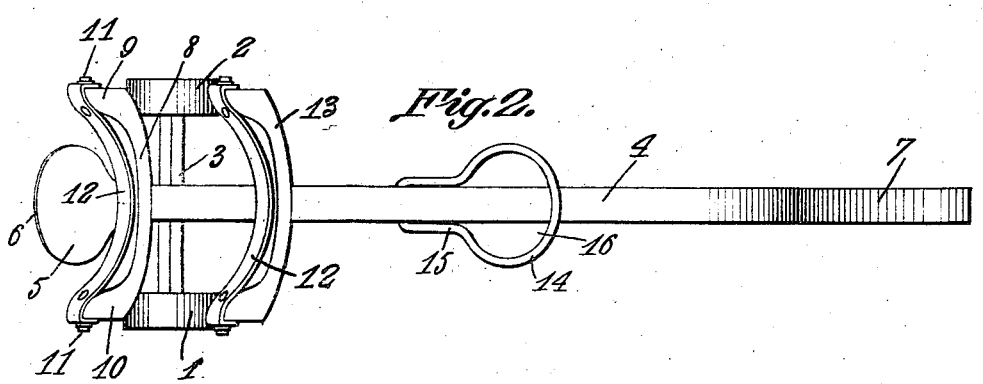
John J. Muir, INVENTOR
WITNESSES
John M. Dobie
Wm. H. Mulligan
BY Richard Bowen,
ATTORNEY

UNITED STATES PATENT OFFICE.

JOHN J. MUIR, OF UNION CITY, PENNSYLVANIA.

TRUCK.

1,250,621.  Specification of Letters Patent. Patented Dec. 18, 1917.

Application filed September 7, 1916. Serial No. 118,872.

*To all whom it may concern:*

Be it known that I, JOHN J. MUIR, a citizen of the United States, residing at Union City, in the county of Erie and State of Pennsylvania, have invented certain new and useful Improvements in Trucks, of which the following is a specification.

This invention relates to trucks and more particularly to a truck for transporting milk cans of large sizes particularly for use in dairies and milk depots.

The primary object of the invention resides in the provision of a truck of this character having a single supporting bar to which yokes are attached for embracing a milk can of the ordinary type.

As a further object of the invention the device is provided with an auxiliary supporting truss carrying a wheel adapted to travel behind the main truck wheels so that the person using the truck will not be required to hold any of the weight of the filled milk can.

Another object of the invention resides in the provision of flexible supporting swings carried by the yokes for resiliently supporting the can when it is being transported.

A further object of this invention is the provision of a truck which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a side elevation.

Fig. 2 is a top plan view.

Referring to the drawing, wherein is illustrated the preferred form of my invention, and in which like numerals of reference indicate corresponding parts throughout the several views, the truck wheels 1 and 2 are mounted upon the square axle 3 to which the lower end of the supporting bar 4 is attached and has one end extended slightly beyond and in front of the axle. A substantially circular lifting plate 5 is carried by the extended end of the supporting bar 4 and has its front curved edge sharpened to provide the blade 6 whereby the plate may be easily thrust beneath a milk can when the same is standing in upright position. The opposite end of the supporting arm 4 is curved to provide the handle 7 which the operator grasps when the truck is being operated.

Mounted upon the supporting bar 4 and slightly in front of the axle 3 is a supporting yoke 8 having the side arms 9 and 10. Secured to the ends of the side arms 9 and 10 is a strip of flexible material formed of heavy fabric, such as canvas, and, if desired, heavy rubber bands may be employed and have their ends attached in the same manner. Each end of each strip is connected by a rivet or other fastening element 11 and the intermediate portion of the strip is supported between the side arms 9 and 10 thereby providing a resilient supporting swing 12 which receives the milk can when the same is being transported.

A second supporting yoke 13 is mounted on the supporting bar 4 in a position to embrace the upper portion of the milk can when the same is in position as shown by dotted lines in Fig. 1. Another supporting swing 12 is carried by the yoke 13 so that the milk can is disposed within a cradle-like structure when it is mounted on the truck. Too great a jar to the can of milk or cream is thereby prevented and a great saving in wear and tear on the cans is also obtained.

Pivotally mounted in the supporting bar 4 is a clip 14 formed of a heavy wire bent to provide the side arms 15 connected to the neck ring 16 which extends over and embraces the neck of the can when the can is mounted upon the truck in the manner shown by Fig. 1 of the drawing.

In use, the truck will be moved up close to the can to be transported and the edge 6 will be thrust under the bottom of the can until the can is raised upon the plate 5. The operator will then drop the ring 16 over the neck of the can and by pulling rearwardly on the supporting bar the can will be lifted from the ground and the truck will be tilted until the greater part of the weight is assumed by the swings 12. By reason of the angular disposition of the can, a portion of the weight will be retained by the plate 5.

In order that the cans may be held at all times at the same angle and also to prevent the operator from assuming any of the weight of the truck, a supporting truss bar 17 extends over the bottom edge of the supporting bar 4 and is disposed at an oblique angle thereto so that it is in a perpendicular position when the truck is loaded. Pivotally mounted at the lower end of the bar 17 is a swivel 18 carrying the supplemental wheel 19 which is disposed directly beneath the supporting bar 4. A brace bar 20 connects the bar 17 with the supporting bar 4.

From the foregoing it will be observed that a very simple and durable truck has been provided, the details of which embody the preferred form. I desire it to be understood however, that slight changes in the minor details of construction may be made without departing from the spirit of the invention or the scope of the claims hereunto appended.

I claim:

1. A truck of the character described comprising a supporting bar, the said supporting bar carrying an axle having wheels attached thereto, a supporting yoke mounted upon the supporting bar in the front of the said axle, and provided with side arms, a strip of flexible material secured to the said side arms, the said flexible material forming a resilient supporting swing, a second supporting yoke mounted near the opposite end of the supporting bar, the said second mentioned yoke being provided with a resilient supporting swing, and a clip pivotally mounted on the supporting bar and bent to provide side arms adapted to extend over and above the said second mentioned swing.

2. A truck of the character described comprising a supporting bar, the said supporting bar carrying an axle having wheels attached thereto, a supporting yoke mounted upon the supporting bar in front of the said axle, and provided with side arms, a strip of flexible material secured to the said side arms, the said flexible material forming a resilient supporting swing, a second supporting yoke mounted near the opposite end of the supporting bar the said second mentioned yoke being provided with a resilient supporting swing, and a clip pivotally mounted on the supporting bar and bent to provide side arms adapted to extend over and above the said second mentioned swing, the lower end of the said supporting bar having a lifting plate attached thereto, the said clip and the said lifting plate coöperating to maintain an object on the truck in position on the said resilient swing.

In testimony whereof I affix my signature in presence of two witnesses.

JOHN J. MUIR.

Witnesses:
BEN C. SHREVE,
SNOE O. HULETT.